(12) United States Patent
Hong et al.

(10) Patent No.: US 10,531,326 B2
(45) Date of Patent: Jan. 7, 2020

(54) METHODS OF CONTROLLING MEASUREMENT PROCESS IN RRC IDLE MODE AND APPARATUSES THEREOF

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/040,924

(22) Filed: Jul. 20, 2018

(65) Prior Publication Data

US 2019/0037425 A1 Jan. 31, 2019

(30) Foreign Application Priority Data

Jul. 26, 2017 (KR) .................. 10-2017-0094902
May 18, 2018 (KR) .................. 10-2018-0056942

(51) Int. Cl.
*H04W 24/10* (2009.01)
*H04W 24/08* (2009.01)
*H04B 7/06* (2006.01)
*H04W 48/12* (2009.01)
*H04W 76/30* (2018.01)

(52) U.S. Cl.
CPC .............. *H04W 24/10* (2013.01); *H04B 7/06* (2013.01); *H04W 24/08* (2013.01); *H04W 48/12* (2013.01); *H04W 76/30* (2018.02)

(58) Field of Classification Search
CPC ..... H04W 24/08; H04W 24/10; H04W 76/27; H04W 76/30; H04W 48/12; H04B 7/06
See application file for complete search history.

(56) References Cited

U.S. PATENT DOCUMENTS

| | | | |
|---|---|---|---|
| 9,961,580 B2 * | 5/2018 | Strobl | H04W 24/10 |
| 2009/0181661 A1 * | 7/2009 | Kitazoe | H04W 48/12 455/418 |
| 2010/0316034 A1 * | 12/2010 | Burbidge | H04W 36/0022 370/338 |
| 2011/0103249 A1 * | 5/2011 | Kim | H04W 24/10 370/252 |
| 2012/0015657 A1 * | 1/2012 | Comsa | H04W 52/0206 455/436 |

(Continued)

FOREIGN PATENT DOCUMENTS

| | | |
|---|---|---|
| KR | 10-2010-0100017 A | 9/2010 |
| WO | 2014/185185 A1 | 11/2014 |

*Primary Examiner* — Kevin D Mew
(74) *Attorney, Agent, or Firm* — IP Legal Services, LLC

(57) ABSTRACT

Provided are a method and apparatus for efficiently controlling carrier aggregation of a terminal in a network using LTE or a next generation radio access technology. The method of the terminal may include receiving IDLE mode measurement configuration information for measuring a channel state in an RRC IDLE mode from a base station, performing at least one of storing and applying the IDLE mode measurement configuration information, and transmitting IDLE mode measurement result information measured in the RRC IDLE mode based on the IDLE mode measurement configuration information to the base station.

17 Claims, 8 Drawing Sheets

(56) References Cited

U.S. PATENT DOCUMENTS

| | | | |
|---|---|---|---|
| 2012/0044910 A1* | 2/2012 | Maeda | H04L 5/0005 370/332 |
| 2012/0076059 A1* | 3/2012 | Wu | H04W 24/10 370/311 |
| 2013/0040659 A1* | 2/2013 | Van Der Velde | H04W 24/10 455/456.1 |
| 2013/0065585 A1* | 3/2013 | Pelletier | H04W 12/02 455/435.1 |
| 2013/0178224 A1* | 7/2013 | Chang | H04W 24/10 455/452.1 |
| 2013/0235738 A1* | 9/2013 | Siomina | H04W 24/00 370/252 |
| 2014/0086112 A1* | 3/2014 | Stern-Berkowitz | H04W 72/1289 370/280 |
| 2014/0086173 A1* | 3/2014 | Sadeghi | H04L 5/005 370/329 |
| 2014/0146696 A1* | 5/2014 | Lin | H04W 72/12 370/252 |
| 2015/0092768 A1* | 4/2015 | Ng | H04W 48/16 370/350 |
| 2015/0304927 A1* | 10/2015 | Takahashi | H04W 48/16 455/436 |
| 2016/0057645 A1 | 2/2016 | Takano | |
| 2016/0080958 A1* | 3/2016 | Rinne | H04W 24/10 370/338 |
| 2016/0081021 A1* | 3/2016 | Abdel-Samad | H04W 52/0209 370/311 |
| 2016/0212595 A1* | 7/2016 | Fukuta | H04W 4/06 |
| 2016/0262091 A1* | 9/2016 | Harada | H04J 11/0069 |
| 2016/0330641 A1* | 11/2016 | Zhang | H04W 24/02 |
| 2017/0006510 A1* | 1/2017 | Kaikkonen | H04H 20/38 |
| 2017/0171786 A1* | 6/2017 | Mochizuki | H04W 36/00835 |
| 2018/0027466 A1* | 1/2018 | Trott | H04W 36/14 455/437 |
| 2018/0063735 A1* | 3/2018 | Raghunathan | H04W 24/08 |
| 2018/0192412 A1* | 7/2018 | Novlan | H04W 76/10 |

\* cited by examiner

METHODS OF CONTROLLING MEASUREMENT PROCESS IN RRC IDLE MODE AND APPARATUSES THEREOF

CROSS REFERENCE TO RELATED APPLICATION

This application claims priority from Korean Patent Application Nos. 10-2017-0094902 & 10-2018-0056942, filed on Jul. 26, 2017 & May 18, 2018, which are hereby incorporated by reference for all purposes as if fully set forth herein.

BACKGROUND OF THE INVENTION

1. Field of the Invention

The present disclosure relates to a method and apparatus for efficiently controlling carrier aggregation of a terminal in a network that uses long term evolution (LTE) or a next generation radio access technology, and more particularly, to a technique for allowing a terminal to perform a cell measurement operation in a Radio Resource Control (RRC) IDLE mode and to report a result of the operation.

2. Description of the Prior Art

Many studies have been conducted for developing next generation mobile communication technologies for large-capacity data processing and high-speed data processing. For example, in mobile communication systems based on the 3rd generation partnership project (3GPP), such as Long Term Evolution (LTE), LTE-Advanced, and 5G, a communication system has been required for transmitting and receiving a large amount of data, such as voice data, video data, and radio data, at a high speed.

In order for large-capacity and high-speed data processing, a carrier aggregation technique has been developed for a terminal and a base station to aggregate a plurality of carriers and transmit and receive data.

However, in order to transmit and receive data through carrier aggregation, there is a need for a complicated procedure for enabling a terminal to measure quality of a target carrier and report the measurement to a base station and for enabling the base station to select carriers and determine whether to perform carrier aggregation.

However, such a complicated carrier aggregation procedure causes a problem of delaying service provision terminal. Accordingly, there is a demand for development of a technique for allowing a terminal to quickly complete carrier aggregation before providing communication services.

SUMMARY OF THE INVENTION

In the foregoing background, the present disclosure is directed to a method and apparatus for enabling a terminal to i) perform a measurement operation for carrier aggregation even in a Radio Resource Control (RRC) IDLE mode in which a terminal/user equipment (UE) is not in an RRC Connected state and ii) quickly perform a procedure for carrier aggregation by changing a procedure of reporting a result of the measurement operation to a base station.

In accordance with an embodiment, a method of a terminal may be provided for performing a measurement operation in an RRC IDLE mode. The method may include receiving IDLE mode measurement configuration information for measuring a channel state in the RRC IDLE mode from a base station, performing at least one of storing and applying the IDLE mode measurement configuration information, and transmitting IDLE mode measurement result information, which is measured in the RRC IDLE mode on the basis of the IDLE mode measurement configuration information, to the base station.

In accordance with another embodiment, a method of a base station may be provided for controlling an RRC IDLE mode measurement operation of a terminal. The method may include generating IDLE mode measurement configuration information for measuring a channel state in an RRC IDLE mode of the terminal, adding the IDLE mode measurement configuration information to at least one of system information block 5 (SIB5) and an RRC connection release message, transmitting at least one of the SIB5 and the RRC connection release message to the terminal, and receiving IDLE mode measurement result information measured in the RRC IDLE mode on the basis of the IDLE mode measurement configuration information.

In accordance with further another embodiment, a terminal may be provided for performing a measurement operation in an RRC IDLE mode. The terminal may include a receiver configured to receive IDLE mode measurement configuration information for measuring a channel state in the RRC IDLE mode from a base station, a controller configured to perform at least one of storing and applying the IDLE mode measurement configuration information, and a transmitter configured to transmit IDLE mode measurement result information, which is measured in the RRC IDLE mode based on the IDLE mode measurement configuration information, to the base station.

In accordance with still another embodiment, a base station may be provided for controlling an RRC IDLE mode measurement operation of a terminal. The base station may include a controller configured to generate IDLE mode measurement configuration information for measuring a channel state in an RRC IDLE mode of the terminal, a transmitter configured to add the IDLE mode measurement configuration information to at least one of system information block 5 (SIB5) and an RRC connection release message and then transmit at least one of the SIB5 and the RRC connection release message to the terminal, and a receiver configured to receive IDLE mode measurement result information measured in the RRC IDLE mode based on the IDLE mode measurement configuration information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
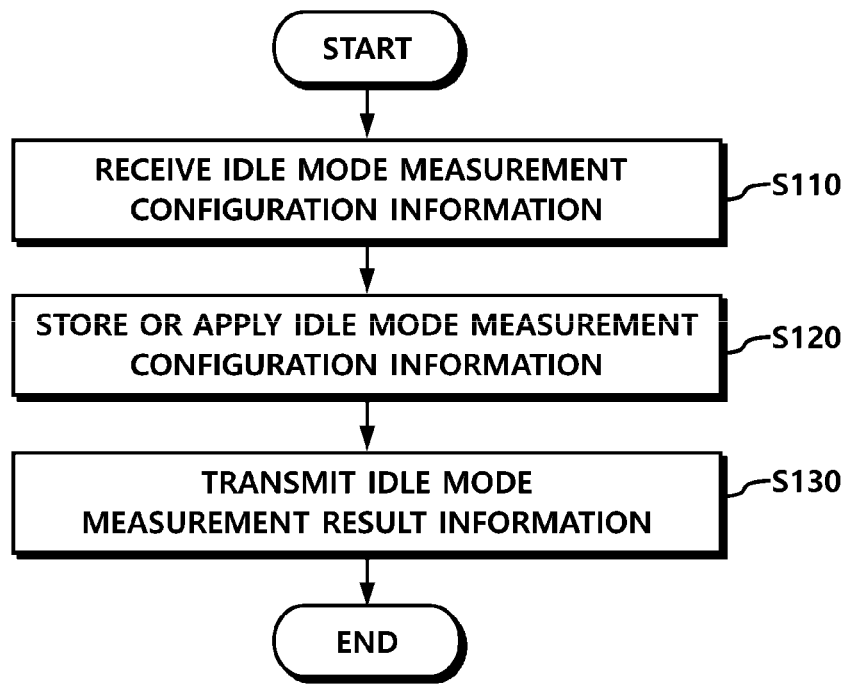
FIG. 1 is a flowchart for a terminal operation according to an embodiment.

Hereinafter, some embodiments of the present disclosure will be described in detail with reference to the accompanying drawings. When assigning a reference number to each component shown in the drawings, it should be noted that the same components are given the same reference numbers even though they are shown in different drawings. Further, in the following description of the present invention, a detailed description of known functions and configurations incorporated herein will be omitted when it is determined that the description may make the subject matter of the present disclosure unclear.

In this specification, a machine type communication (MTC) terminal refers to a terminal that supports low cost or low complexity, a terminal that supports coverage enhancement, or the like. In this specification, the MTC terminal refers to the terminal that supports low costs or low complexity, the terminal that supports coverage enhancement, or the like. Alternatively, in this specification, the MTC terminal may refer to a terminal defined in a predetermined category for supporting low cost (or low complexity) and/or coverage enhancement.

In other words, in this specification, the MTC terminal may refer to a newly defined third generation partnership project (3GPP) Release 13 low cost (or low complexity) user equipment (UE) category/type, which executes LTE-based MTC-related operations. Alternatively, in this specification, the MTC terminal may refer to a UE category/type defined in or before 3GPP Release 12 that supports enhanced coverage in comparison with the existing LTE coverage or supports low power consumption or may refer to a newly defined Release 13 low cost (or low complexity) UE category/type.

A wireless communication system according to the present disclosure may be widely installed to provide various communication services, such as voice data, packet data, and the like. The wireless communication system may include a user terminal (hereinafter also referred to as a user equipment (UE) and a base station (BS) (or an evolved node B (eNB). Throughout the specification, a user terminal may be an inclusive concept indicating a terminal utilized in wireless communication. The user terminal includes a mobile station (MS), a user terminal (UT), a subscriber station (SS), a wireless device, and the like in global systems for mobile communication (GSM) as well as a UE in wideband code division multiple access (WCDMA), long term evolution (LTE), high speed packet access (HSPA), and the like.

A base station or a cell may generally refer to a station that communicates with a user terminal, and the term "base station" may be interchangeably used with the terms "Node-B," "evolved Node-B (eNB)," "sector," "site," "base transceiver system (BTS)," "access point," "relay node," "remote radio head (RRH)", "radio unit (RU), "small cell", and the like.

That is, in this specification, the base station or the cell may be construed as an inclusive concept indicating some areas or functions covered by a base station controller (BSC) in CDMA, a NodeB in WCDMA, an eNB or a sector (site) in LTE, and the like, and the concept may include any of various coverage areas such as a megacell, a macrocell, a microcell, a picocell, a femtocell, communication ranges of a relay node, an RRH, an RU, and a small cell.

There is a base station for controlling each of the above various cells. Thus, the base station may be construed in the following two ways: (1) the base station may be an apparatus that provides a megacell, a macrocell, a microcell, a picocell, a femtocell, and a small cell in association with a wireless area; or (2) the base station may indicate the wireless area itself. In (1), base stations may be i) all apparatuses that provide a predetermined wireless area and that are controlled by the same entity or ii) all apparatus that interact with one another to cooperatively configure a wireless area. Based on the configuration type of the wireless area, a base station may be one of an eNB, an RRH, an antenna, an RU, a low power node (LPN), a point, a transmission/reception point, a transmission point, a reception point, and the like. In (2), the base station may be the wireless area itself where signals are received or transmitted from the perspective of the user terminal or a neighboring base station.

Therefore, the megacell, the macrocell, the microcell, the picocell, the femtocell, the small cell, the RRH, the antenna, the RU, the LPN, the point, the eNB, the transmission/reception point, the transmission point, and the reception point are collectively referred to as the base station.

In this specification, the user terminal and the base station are used as two inclusive transceiving subjects to embody the technology and technical concepts described in this specification and may not be limited to predetermined terms or words. In this specification, the user terminal and the base station are used as two (uplink or downlink) inclusive transceiving subjects to embody the technology and technical concepts described in this specification and may not be limited to predetermined terms or words. Here, uplink (UL) refers to a scheme of data transmission and reception from a UE to a base station. Downlink (DL) refers to a scheme of data transmission and reception from the base station to the UE.

There are no restrictions on multiple access schemes applied to wireless communication systems. Multiple access schemes such as code division multiple access (CDMA), time division multiple access (TDMA), frequency division multiple access (FDMA), orthogonal frequency division multiple access (OFDMA), OFDM-FDMA, OFDM-TDMA, OFDM-CDMA, and the like may be used. An embodiment of the present disclosure may be applicable to resource allocation in an asynchronous wireless communication scheme that evolves to LTE and LTE-advanced via Global systems form mobile communication (GSM), wideband code division multiple access (WCDMA), and high speed packet access (HSPA) and in a synchronous wireless communication scheme that evolves to CDMA, CDMA-2000, and UMB. The embodiments of the present disclosure should not be construed as being restricted or limited to a specific wireless communication field and should be construed as including all technical fields to which the technical spirit of the present disclosure is applicable.

UL transmission and DL transmission may be performed using i) a time division duplex (TDD) scheme in which the transmission is performed by means of different times or ii) a frequency division duplex (FDD) scheme in which the transmission is performed by means of different frequencies.

Further, in a system such as LTE and LTE-A, a specification is formed by configuring an uplink and a downlink based on a single carrier or a pair of carriers. The uplink and the downlink may carry control information through a control channel such as a Physical Downlink Control Channel (PDCCH), Physical Control Format Indicator Channel (PCFICH), Physical Hybrid ARQ Indicator Channel (PITCH), Physical Uplink Control Channel (PUCCH), Enhanced Physical Downlink Control Channel (EPDCCH), and the like and may carry data through a data channel such as a Physical Downlink Shared Channel (PDSCH), Physical Uplink Shared Channel (PUSCH), and the like.

Meanwhile, the uplink and the downlink may carry control information even by using enhanced PDCCH or extended PDCCH (EPDCCH).

In this specification, the cell may refer to the coverage of a signal transmitted from the transmission/reception point (or the transmission point), a component carrier having the coverage of the signal transmitted from the transmission/reception point, or the transmission/reception point itself.

A wireless communication system according to the following embodiments refers to a coordinated multi-point transmission/reception (CoMP) system where two or more transmission/reception points cooperatively transmit a signal, a coordinated multi-antenna transmission system, or a coordinated multi-cell communication system. The CoMP system may include at least two multi-transmission/reception points and terminals.

Each of the multi-transmission/reception points may be a base station or a macrocell (hereinafter, referred to as an (eNB) and at least one RRH that has high transmission power or low transmission power within a macrocell area and that is connected to an eNB through an optical cable or an optical fiber and controlled in a wired manner.

Hereinafter, a downlink refers to communication or a communication path from a multi-transmission/reception point to a terminal, and an uplink refers to communication or a communication path from a terminal to a multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, the situation in which the signal is transmitted and received through a channel such as PUCCH, PUSCH, PDCCH, EPDCCH, and PDSCH may be described through the expression "PUCCH, PUSCH, PDCCH, EPDCCH, and PDSCH are transmitted or received."

In addition, hereinafter, the expression "PDCCH is transmitted or received" or "the signal is transmitted or received through PDCCH" includes "EPDCCH is transmitted or received" or "the signal is transmitted or received through EPDCCH".

That is, a physical downlink control channel used herein may indicate PDCCH or EPDCCH and may indicate both of the PDCCH and the EPDCCH.

Also, for convenience of description, according to an embodiment of the present disclosure, EPDCCH may be applied to a part described using PDCCH, and PDCCH may be applied to a part described using EPDCCH.

Meanwhile, higher layer signaling, which will be described below, includes Radio Resource Control (RRC) signaling that carries RRC information including RRC parameters.

An eNB performs downlink transmission to terminals. The eNB may a transmit Physical Downlink Shared Channel (PDSCH), which is a primary physical channel for unicast transmission, and may a transmit Physical Downlink Control Channel (PDCCH) for carrying downlink control information such as scheduling required for reception of the PDSCH and scheduling approval information for transmission of an uplink data channel (e.g., Physical Uplink Shared Channel (PUSCH)). Hereinafter, transmission and reception of a signal through each channel will be described as transmission and reception of a corresponding channel.

As a representative usage scenario in new radio (NR), which is being discussed recently in the 3GPP, enhanced Mobile BroadBand (eMBB), massive Machine Type Communication (mMTC), and Ultra Reliable and Low Latency Communication (URLLC) have been proposed.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with NR may be interpreted with various meanings in the past, at present, or in the future.

For example, in the present specification, the LTE and the NR refer to different wireless access technologies, and a new wireless access technology, which has being discussed in 3GPP Release 15, is described as the NR The NR may have various differences from the LTE in terms of a frame structure, a channel, a core network technology, and the like. Various functions for wireless transmission, high-speed transmission, and large-scale data transmission in high bands may be added to the NR.

Hereinafter, for convenience of description, the typical wireless access technology will be described as the LTE, and a new wireless access technology being discussed in the 3GPP will be described as the NR. Also, the base station may be an eNB using the LTE technology and also may be a gNode-B (gNB) using the NR technology, which will be separately described as necessary.

Also, the term "cell" is comprehensively used to cover a wireless path, a wireless link, a carrier, and the like for carrying data. One base station may transmit and receive data through a plurality of cells. Alternatively, the terminal may transmit and receive data using a plurality of cells by means of cells controlled by two base stations. In the following description, one base station controlling a plurality of cells may be referred to as carrier aggregation, and two or more base stations cooperatively controlling a plurality of cells may be referred to as dual connectivity.

Carrier aggregation (CA) technology is a technology for boosting a data transmission rate for a terminal through an additional cell. In the typical CA technology, an RRC connection may be established in a terminal, a cell serving as a criterion for handover may be set as a primary cell (PCell), and a cell for allocating additional radio resources to a terminal and transmitting and receiving data may be set as a secondary cell (SCell). However, in the typical CA technology, when SCell is configured in the terminal, there is a time delay in an operation of controlling a procedure for the configuration and in whether to activate the configured SCell.

In detail, before performing CA on a terminal in an RRC Connected state (RRC Connected mode), a base station provides, to the terminal, measurement configuration information for a frequency of a candidate cell that may be configured as the SCell. The terminal transmits, to the base station, a result of performing an operation of measuring the frequency of the candidate cell by using a reporting configuration for the measurement configuration information. The base station additionally configures the SCell in the terminal on the basis of the received measurement report. Subsequently, the base station may determine whether to activate the SCell in consideration of additional measurement reporting, transmission and reception data amounts, and the like for the SCell and may instruct the SCell to be activated to transmit user data.

Accordingly, in order for a terminal in the RRC IDLE mode to configure and utilize CA, in the typical CA technology, there has been a considerable time delay until the terminal transits to the RRC Connected state, configures carrier aggregation, and actually transmits and receives user data through the configured carrier aggregation.

As a method of solving this problem, research has been conducted on blind SCell configuration in which a base station configures the SCell without measurement configuration or measurement reporting. However, this may only be applied to cells having the same coverage or location. Thus, it is difficult to actually apply the method.

Therefore, the present disclosure is intended to provide a specific procedure for a terminal in the RRC IDLE state to apply a measurement configuration and report a measurement result to a base station while preventing the above-described time delay problem in order to control the terminal and the base station to quickly configure CA. That is, the disclosure is intended to provide a technique for reducing a SCell setup delay so that the terminal may quickly perform SCell configuration after transitioning from the RRC IDLE mode (state) to the RRC Connected state.

Hereinafter, the spirit of the present disclosure will be described based on a procedure that may be applied to LTE technology. However, this is for convenience for description and ease of understanding, and the spirit of the present disclosure may be applied to all radio communication technologies to which various carrier aggregation techniques are to be applied, including next generation radio access technologies (New RAT, NR, etc.) as well as the LTE technology. Accordingly, there is no limitation on radio access technologies to which a procedure for performing a cell measurement operation and reporting a result of the operation may be applied when a terminal is in the RRC IDLE state.

In this specification, information included in each message and signal will be described in detail, but various information, as well as information which will be described below, may be included in the messages and signals. For example, information elements specified in 3GPP technical specification (TS) 36.331 may be included in each message or signal. Therefore, information elements that are unnecessary to describe this embodiment, information element that are specified in 3GPP TS 36.331, or the like may not be described to facilitate an understanding of the present invention.

In this specification, a technique in which a terminal in the RRC IDLE state quickly sets up SCell to configure carrier aggregation after transitioning to the RRC Connected state will be described using IDLE mode measurement, low-latency SCell measurement, low-latency measurement, low-latency SCell setup, low-latency reporting, and the like. In this case, various terms such as an SCell setup reduction function, an idle SCell/neighbor cell measurement function, a connection setup reporting function, an early setup/reporting function, and the like may be used. Therefore, there is no limitation on the name of the technique in which the terminal in the RRC IDLE state measures a cell or carrier channel state and transmits a result of the measurement.

Also, as described above, cell measurement, carrier measurement, frequency measurement, and channel measurement will be used below in the same sense and refer to an operation of measuring a channel state of a cell or a carrier to be added to SCell. Various channel measurement algorithms may be applied to channel state measurement. For example, measurement algorithms using Reference Signal Received Power (RSRP) and Reference Signal Received Quality (RSRQ) may be used, and also various other open algorithms may be used. Accordingly, in this specification, there is no limitation on a specific measurement algorithm.

FIG. 1 is a flowchart illustrating a terminal operation according to an embodiment.

Referring to FIG. 1, in order to perform a measurement operation in an RRC IDLE mode, a terminal may receive IDLE mode measurement configuration information, which is used to measure a channel state in the RRC IDLE mode, from a base station (S110). For example, the terminal may receive measurement configuration information from the base station. The measurement configuration information is needed to perform the measurement operation on the cell or carrier in the RRC IDLE state. The IDLE mode measurement configuration information may be received while the terminal is in the RRC Connected state or during an RRC connection release operation.

For example, the IDLE mode measurement configuration information may include at least one of measurement target carrier frequency information, measurement duration information, target cell list information, and measurement reference information, which are used by the terminal to perform the measurement operation in the RRC IDLE mode.

For another example, the IDLE mode measurement configuration information may include valid area information including a cell list for indicating whether the terminal maintains the RRC IDLE mode measurement operation according to a cell reselection operation of the terminal.

The terminal may receive the IDLE mode measurement configuration information through System Information Block 5 (SIB5) or an RRC connection release message.

For example, the terminal may receive the IDLE mode measurement configuration information through an SIB5 signal. For another example, the terminal may receive the IDLE mode measurement configuration information through the RRC connection release message received while the terminal transitions from the RRC Connected mode to the RRC IDLE mode. For still another example, the terminal may receive information included in the IDLE mode measurement configuration information through different signals. In detail, the terminal may receive at least one of the measurement target carrier frequency information, the target cell list information, the measurement reference information, and the valid area information through the SIB5 signal and may receive measurement duration information through the RRC connection release message. That is, the terminal may receive individual pieces of the IDLE mode measurement configuration information through a plurality of signals.

Meanwhile, the measurement duration information may include valid time information for restricting the RRC IDLE mode measurement operation of the terminal, and the target cell list information may include one or more pieces of physical cell identification information. The valid time information is applied to a timer and configured in the terminal, and the terminal may determine whether to execute the RRC IDLE mode measurement operation and whether to store/apply the IDLE mode measurement configuration information according to activation or expiration of the timer.

The terminal may store or apply the IDLE mode measurement configuration information (S120). For example, the terminal may store or apply the IDLE mode measurement configuration information, which is received through SIB5 or the RRC connection release message, to perform the RRC IDLE mode measurement operation.

The RRC IDLE mode measurement operation may be performed after the terminal transitions from the RRC Connected state to the RRC IDLE state. For example, a valid time of the timer is set according to the measurement duration information included in the IDLE mode measurement configuration information. While such a timer is running, the terminal may perform the RRC IDLE mode measurement operation on the measurement target carrier frequency.

Alternatively, when the valid time of the timer expires, the terminal may release the received IDLE mode measurement configuration information. For example, the terminal may delete or deactivate the IDLE mode measurement configuration information associated with the timer.

Also, the terminal may store therein a measurement result value for each cell or carrier acquired through the RRC IDLE mode measurement operation. The stored measurement result value may be included in IDLE mode measurement result information.

The terminal may transmit, to the base station, the IDLE mode measurement result information that is measured in the RRC IDLE mode on the basis of the IDLE mode measurement configuration information (S130). According to the RRC IDLE mode measurement operation, the terminal may i) measure a channel state (or channel quality) of a measurement target cell or carrier and may add information regarding a result of the measurement to the IDLE mode measurement result information and ii) transmit the measurement result information to the base station when the terminal transitions to the RRC Connected state.

For example, when the transition from the RRC IDLE mode to the RRC Connected state is completed, the terminal may add the IDLE measurement result information to an RRC connection setup completion message or an RRC connection resumption completion message and transmit the message to the base station.

Through such an operation, the terminal may perform a measurement operation in the RRC IDLE state by using the IDLE measurement configuration information received in the RRC Connected state and may notify the base station of a result of the measurement when the terminal transitions to the RRC Connected state. As the terminal transitions to the RRC Connected state, the base station may check the measurement result and start a carrier aggregation operation, and thus it is possible to remove delay in the carrier aggregation configuration process of the terminal.

A specific procedure for the terminal to store a measurement result and report the measurement result to the base station will be described below with reference to the accompanying drawings.

Figure 2:
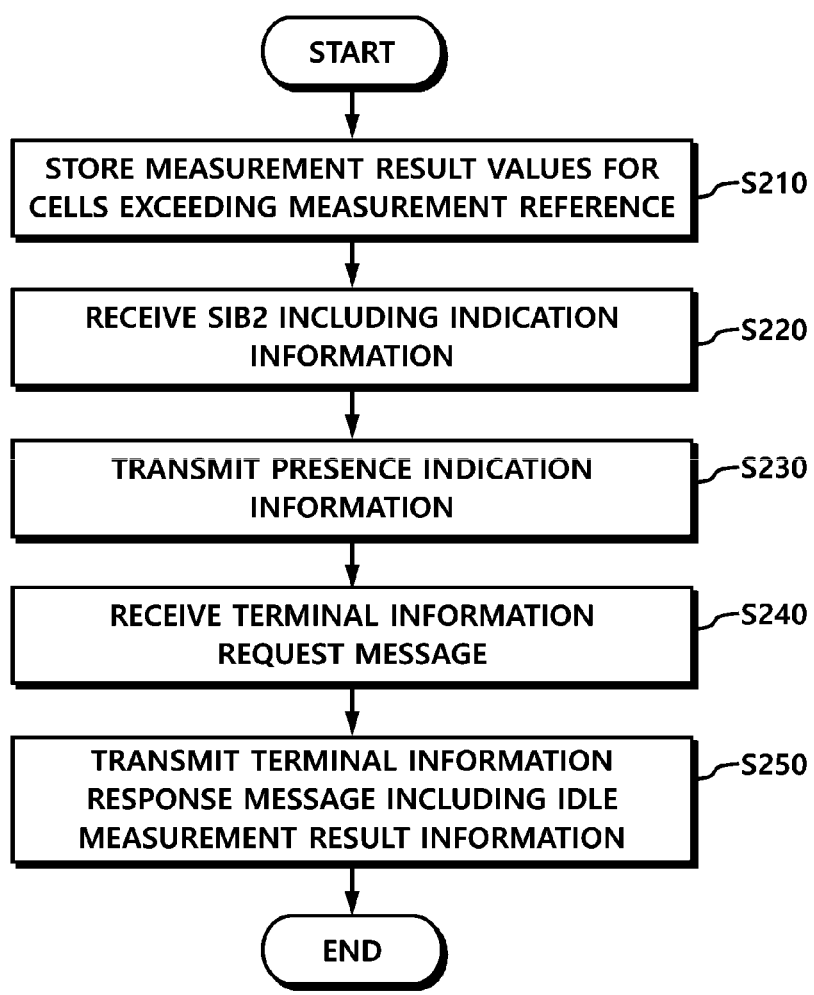
FIG. 2 is a flowchart for illustrating a specific terminal operation for transmitting IDLE mode measurement result information according to an embodiment.

FIG. 2 is a flowchart illustrating a specific terminal operation for transmitting IDLE mode measurement result information according to an embodiment.

Referring to FIG. 2, the terminal may compare measurement reference information included in the IDLE mode measurement configuration information to a cell-specific measurement result value measured in the RRC IDLE mode and store a measurement result value for a cell exceeding a measurement reference as the IDLE mode measurement result information (S210). For example, the terminal may measure the channel state of the measurement target carrier or cell on the basis of the IDLE mode measurement configuration information. Also, the terminal may compare a measurement result value for each cell or carrier to a measurement reference included in the IDLE mode measurement result information and may store measurement result values for cells or carriers exceeding the measurement reference. The stored measurement result value may be stored in the IDLE mode measurement result information on a cell basis or on a carrier basis.

Meanwhile, the terminal cannot transmit the IDLE mode measurement result information to the base station in the RRC IDLE mode. Accordingly, a procedure is required for transmitting the IDLE measurement result information.

The terminal may receive system information block 2 (SIB2) including indication information indicating that the base station can process the IDLE mode measurement result information (S220). For example, the base station may add, to SIB2, indication information indicating that the base station can receive and process the IDLE mode measurement result information and may broadcast SIB2 including the indication information.

When SIB2 including the indication information is received from the base station, the terminal checks the indication information and recognizes that the base station is in a state capable of receiving the IDLE mode measurement result information.

The terminal may transmit, to the base station, presence indication information indicating whether the IDLE mode measurement result information is present in the RRC connection setup process for the terminal (S230). For example, for any reason (e.g., a connection state transition event trigger), the terminal may transition from the RRC IDLE mode to the RRC connection mode. To this end, the terminal performs an RRC connection setup procedure along with the base station.

The terminal delivers, to the base station, presence indication information indicating that the IDLE mode measurement result information is stored in the terminal during the RRC connection setup procedure. For example, the terminal may add the presence indication information to the RRC connection setup completion message and then transmit the RRC connection setup completion message. For another example, the terminal may add the presence indication information to an RRC connection resumption completion message and then transmit the RRC connection resumption completion message. As described above, the terminal transitions to the RRC Connected mode, adds presence indication information to a message indicating that the transition is completed, and transmits the message to the base station. Thus, the base station recognizes that the terminal has stored the IDLE mode measurement result information measured in the RRC IDLE mode.

The terminal may receive a terminal information request message from the base station (S240). The terminal may deliver the IDLE mode measurement result information to the base station according to a terminal information request procedure. For example, when the base station receives the presence indication information and determines that the IDLE mode measurement result information is included in the terminal, the base station transmits the terminal information request message to the terminal in order to receive the IDLE mode measurement result information.

When the terminal information request message is received, the terminal may add the IDLE mode measurement result information to a terminal information response message and may transmit the terminal information response message to the base station (S250). For example, when a terminal request message for requesting the IDLE mode measurement result information from the base station is received, the terminal adds the IDLE mode measurement result information stored in step S210 to the terminal information response message and delivers the terminal information response message to the base station.

Through this process, the terminal may transmit the IDLE mode measurement result information to the base station after the terminal transitions to the RRC Connected state. Accordingly, it is possible to reduce delay by changing a typical process in which the terminal receives measurement configuration information for CA, measures a cell, and reports a measurement result report after transitioning to the RRC Connected state to the above-described new process in which the terminal reports a measurement result immediately after transitioning to the RRC Connected state.

The above-described terminal operation will be described again with reference to the accompanying drawings depending on signal flow as related to a terminal and a base station.

Figure 3:
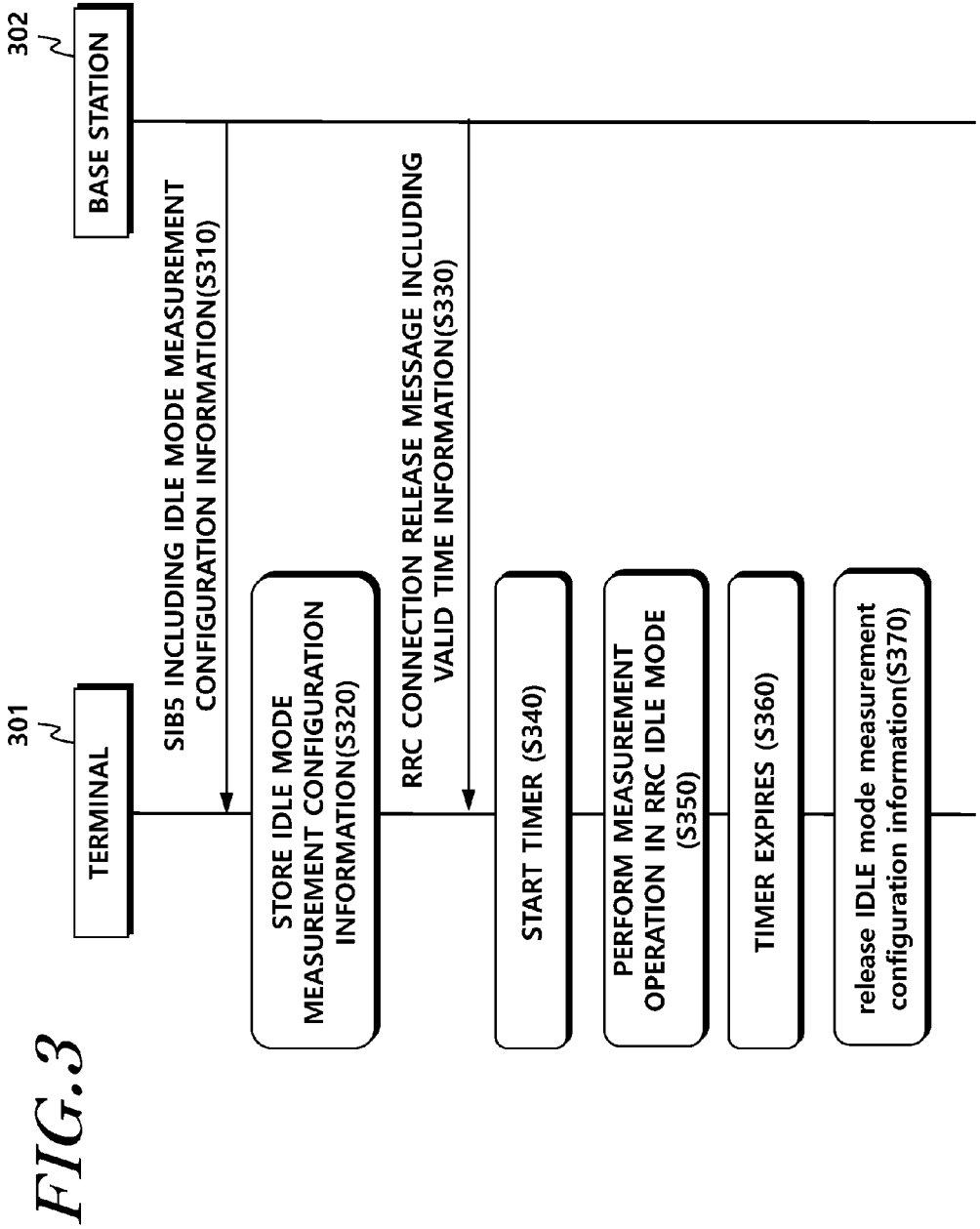
FIG. 3 is a signal diagram for illustrating a terminal operation at the end of a timer according to an embodiment.

FIG. 3 is a signal diagram illustrating a terminal operation at the end of a timer according to an embodiment.

Referring to FIG. 3, a base station 302 may transmit IDLE mode measurement configuration information to a terminal 301 (S310). For example, the IDLE mode measurement configuration information may include at least one of i) measurement target carrier frequency information, ii) target cell list information, iii) valid area information, and iv) measurement reference information, which are needed for the terminal 301 to perform a measurement operation in the RRC IDLE mode. Also, the base station 302 adds the IDLE mode measurement configuration information to SIB5 and transmits SIB5 to the terminal 301.

The terminal 301 may store the received IDLE mode measurement configuration information (S320). The base station 302 transmits measurement duration information to the terminal 301 through a separate message different from the message in step S310 (S330). For example, when the terminal 301 transitions from the RRC Connected state to the RRC IDLE state, the base station 302 may transmit measurement duration information, which includes valid time information, to the terminal 301 through an RRC connection release message. If necessary, step S320 may be performed simultaneously with or after step S330.

The terminal 301 may receive the valid time information and operate a timer (e.g., T331) for restricting an IDLE mode measurement operation using the valid time information (S340). The terminal 301 may perform a measurement operation of a cell or carrier in the RRC IDLE mode using the IDLE mode measurement configuration information while the terminal is operating (S350).

When the timer expires due to a lapse of the valid time before the terminal 301 transitions to the RCC Connected mode (S360), the terminal 301 releases the IDLE mode measurement configuration information that has been received and stored (S370). To this end, when a corresponding timer expires, the terminal 301 stops the measurement operation in the IDLE mode. A measurement result value measured during step S350 may be deleted in step S370 and stored in the terminal 301.

Through such a restriction operation, it is possible to prevent a power waste in the terminal 301 that may occur as the terminal 301 continuously performs a cell measurement operation in the RRC IDLE mode.

Figure 4:
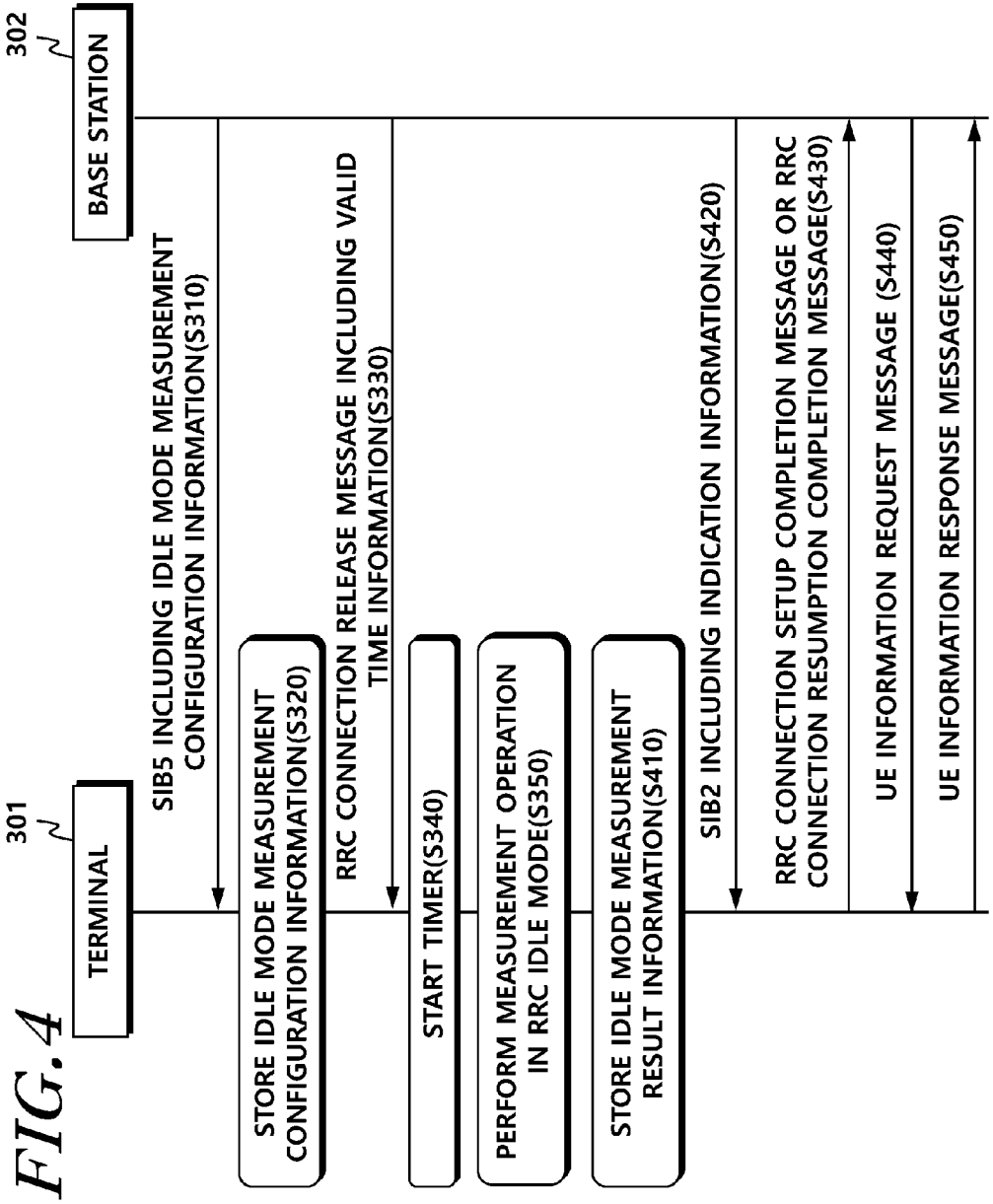
FIG. 4 is a signal diagram for illustrating a terminal operation for performing measurement and reporting in an RRC IDLE mode according to an embodiment.

FIG. 4 is a signal diagram illustrating an operation of a terminal for performing measurement and reporting in an RRC IDLE mode according to an embodiment.

Referring to FIG. 4, steps S310 to S350 are the same as those of FIG. 3. Thus, a description thereof will be omitted herein.

Among result values measured in step S350, the terminal 301 stores, as IDLE mode measurement result information, a measurement result value for each cell or carrier exceeding a measurement reference (S410). Subsequently, the terminal 301 transmits the IDLE mode measurement result information to the base station 302 while transitioning to the RRC Connected state.

For example, the base station 302 receives the IDLE mode measurement result information and broadcasts SIB2 including indication information indicating that processing is possible (S420). The terminal 301 checks the indication information of step S420 and transitions to the RRC Connected state. After the terminal 301 transitions to the RRC Connected state, the terminal 301 adds presence indication information indicating that the IDLE mode measurement result information is stored in the terminal 301 to an RRC connection setup completion message or an RRC connection resumption completion message, and then the terminal 301 transmits the message to the base station 302 (S430).

The base station 302 checks the presence indication information and transmits a terminal information request message to the terminal 301 to request transmission of the IDLE mode measurement result information (S440). The terminal 301 adds the IDLE mode measurement result information to a terminal information response message and transmits the terminal information response message to the base station 302 (S450).

Through this process, the terminal 301 may provide a measurement result for each cell or carrier quickly to the base station 302 after the terminal 301 transitions from the RRC IDLE mode to the RRC Connected mode. Accordingly, the base station 302 may quickly determine whether to configure carrier aggregation in the terminal 301 and may perform a carrier aggregation configuration procedure.

This embodiment that has been described with reference to FIGS. 1 to 4 will be described in terms of the base station.

Figure 5:
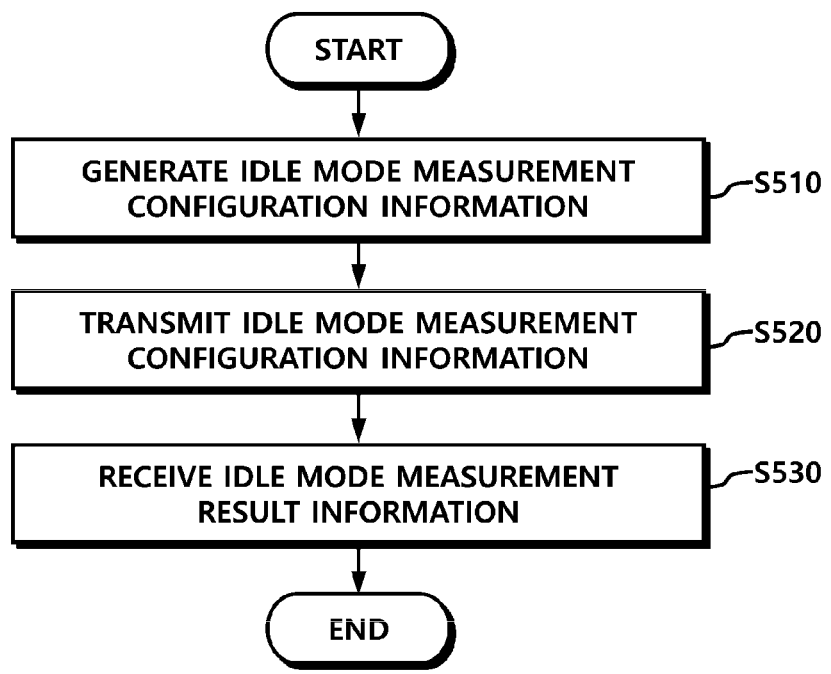
FIG. 5 is a flowchart for illustrating a base station operation according to an embodiment.

FIG. 5 illustrates a base station operation according to an embodiment.

Referring to FIG. 5, the base station may generate IDLE mode measurement configuration information for measuring a channel state in the RRC IDLE mode of the terminal (S510). For example, the IDLE mode measurement configuration information may include at least one of i) measurement target carrier frequency information, ii) measurement duration information, iii) target cell list information, and iv) measurement reference information, which are used by the terminal to perform the measurement operation in the RRC IDLE mode. For another example, the IDLE mode measurement configuration information may include valid area information including a cell list for indicating whether the terminal maintains the RRC IDLE mode measurement operation according to a cell reselection operation of the terminal.

The base station may add the IDLE mode measurement configuration information to SIB5 or an RRC connection release message and transmit SIB5 or the RRC connection release message to the terminal (S510). The base station may transmit measurement configuration information, which is needed to perform the measurement operation on the cell or carrier in the RRC IDLE state, to the terminal. The IDLE mode measurement configuration information may be transmitted while the terminal is in the RRC Connected state or may be transmitted during an RRC connection release operation.

The base station may transmit the IDLE mode measurement configuration information through SIB5 or the RRC connection release message.

For example, the base station may transmit the above-described IDLE mode measurement configuration information through an SIB5 signal. For another example, the base station may transmit the IDLE mode measurement configuration information through the RRC connection release message received while the base station transitions from the RRC Connected mode to the RRC IDLE mode. For still another example, the base station may transmit information included in the IDLE mode measurement configuration information through different signals. In detail, the base station may transmit at least one of the measurement target carrier frequency information, the target cell list information, the measurement reference information, and the valid area information through the SIB5 signal and may transmit measurement duration information through the RRC connection release message. That is, the base station may transmit individual pieces of the IDLE mode measurement configuration information through a plurality of signals.

Meanwhile, the measurement duration information may include valid time information for restricting the RRC IDLE mode measurement operation of the terminal, and the target cell list information may include one or more pieces of physical cell identification information. The valid time information is applied to a timer and configured in the terminal, and the terminal may determine whether to execute the RRC IDLE mode measurement operation and whether to store/apply the IDLE mode measurement configuration information according to activation or expiration of the timer.

Subsequently, the terminal may measure a channel state of a cell or carrier using the IDLE mode measurement configuration information in the RRC IDLE mode and may store a corresponding result value as the IDLE mode measurement result information.

The base station may receive the IDLE mode measurement result information that is measured in the RRC IDLE mode on the basis of the IDLE mode measurement configuration information (S510). The base station may add information, which regards a result measured by the terminal according to the RRC IDLE mode measurement operation, to the IDLE mode measurement result information. After the terminal transitions to the RRC Connected state, the terminal may receive the IDLE mode measurement result information.

For example, when the transition of the terminal from the RRC IDLE mode to the RRC Connected state is completed, the base station may receive, from the terminal, an RRC connection setup completion message or an RRC connection resumption completion message to which the IDLE measurement result information is added. A specific operation in which the base station receives the IDLE mode measurement result information will be described below with reference to FIG. 6.

Figure 6:
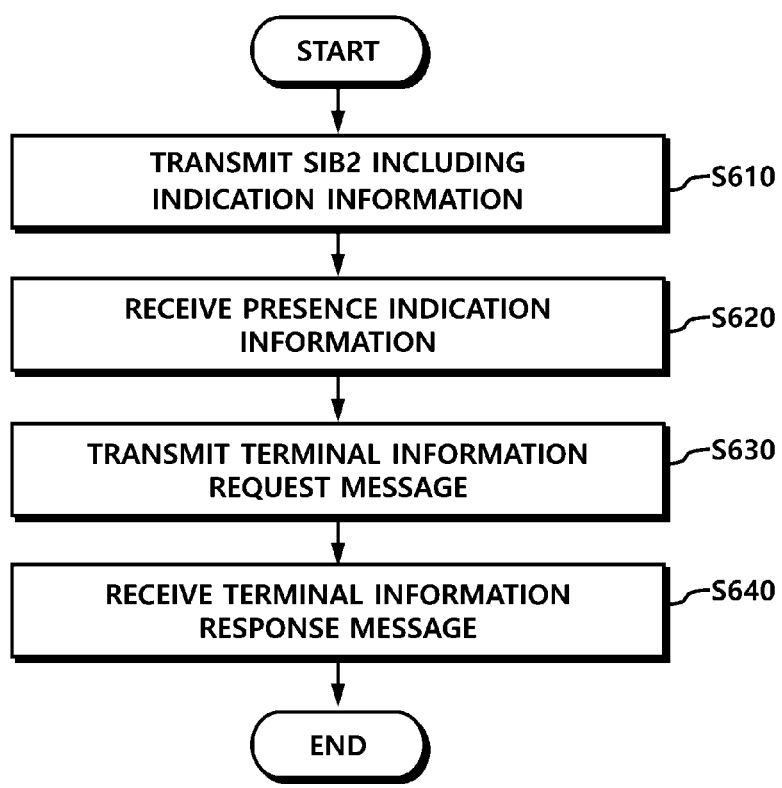
FIG. 6 is a flowchart for illustrating a specific base station operation for receiving IDLE mode measurement result information according to an embodiment.

FIG. 6 illustrates a specific base station operation for receiving IDLE mode measurement result information according to an embodiment.

Referring to FIG. 6, the base station may transmit SIB2 including indication information indicating that the base station can process the IDLE mode measurement result information (S610). For example, the base station may add, to SIB2, indication information indicating that the base station can receive and process the IDLE mode measurement result information and may broadcast SIB2 including the indication information. When SIB2 including the indication information is received from the base station, the terminal checks the indication information and recognizes that the base station is in a state which is capable of receiving the IDLE mode measurement result information.

The base station may receive presence indication information indicating whether the IDLE mode measurement result information is present in the RRC connection setup process for the terminal (S620). For example, for any reason (e.g., a connection state transition event trigger), the terminal may transition from the RRC IDLE mode to the RRC connection mode. During the transition of the terminal to the RRC Connected state, the base station performs an RRC connection setup procedure or an RRC connection resumption procedure along with the terminal.

The base station receives, from the terminal, presence indication information, which indicates the IDLE mode measurement result information is stored in the terminal, during the RRC connection setup procedure or the RRC connection resumption procedure. For example, the base station may receive the RRC connection setup completion message to which the presence indication information is added. As another example, the base station may receive the RRC connection resumption completion message to which the presence indication information is added. As described above, the terminal transitions to the RRC Connected mode, and the base station receives a message which indicates that the transition is completed, and to which presence indication information is added. Thus, the base station recognizes that the terminal has stored the IDLE mode measurement result information measured in the RRC IDLE mode.

The base station may transmit a terminal information request message for requesting the IDLE mode measurement result information (S630). For example, the base station receives the presence indication information, determines that the IDLE mode measurement result information is included in the terminal, and then transmits the terminal information request message to the terminal in order to receive the IDLE mode measurement result information. That is, the base station transmits a message for requesting the IDLE mode measurement result information to the terminal.

The base station may compare measurement reference information included in the IDLE mode measurement configuration information to a result value measured for each cell in the RRC IDLE mode and receive a terminal information response message including the IDLE mode measurement result information in which result values for cells exceeding the measurement reference are stored (S640). For example, the base station may receive the terminal information response message including the IDLE mode measurement result information in response to the terminal request message transmitted in step S630. Thus, the base station may acquire information regarding results measured by the terminal in the RRC IDLE state.

As described with reference to FIGS. 1 to 6, specific procedures according to embodiments of the present disclosure are disclosed for performing quality measurement on a cell or carrier while the terminal is in the RRC IDLE state and delivering a result of the quality measurement to the base station during the RRC connection process. Accordingly, the base station may reduce a time consumed for a procedure for adding a carrier to the terminal, and also the terminal may be supported in allowing quick carrier addition while preventing unnecessary power consumption by restricting the RRC IDLE measurement operation through a timer.

In addition to the above-described embodiments, various embodiments will be described below for each procedure. The following embodiments may be applied individually or in combination.

Embodiment for Indication of IDLE Mode Measurement Configuration Information for SCell Measurement of the Terminal in the RRC IDLE State Hereinafter, a method of indicating configuration information needed for a terminal in the RRC IDLE state to perform a measurement operation on SCell in order to reduce an SCell setup time will be described.

After a terminal camped on a specific cell and in the RRC IDLE state transitions to the RRC Connected state, the base station may broadcast cell list information (e.g., a neighboring cell/a candidate cell/a candidate neighboring cell/a candidate cell frequency/a candidate frequency) and its associated information that may be used to configure a corresponding cell as an additional cell through system information in order to reduce the SCell setup time.

For example, the base station may add information regarding a candidate cell that may be configured as an additional cell in order to reduce the SCell setup time to cell reselection common information for an intra frequency, an inter frequency, or inter-RAT cell selection in addition to intra frequency cell reselection information through system information block 3 (SIB3) and may broadcast the cell reselection common information.

For another example, the base station may add information regarding a candidate cell that may be configured as an additional cell in order to reduce the SCell setup time to inter frequency cell reselection information provided through SIB5, that is, another Evolved Universal Terrestrial Radio Access Network (E-UTRAN) frequency and inter frequency neighboring cell information for cell reselection, and may broadcast the inter frequency cell reselection information.

For still another example, the base station may broadcast information regarding a candidate cell that may be configured as an additional cell in order to reduce the SCell setup time through other system information which is different from SIB5.

For further still another example, the base station may transmit the IDLE mode measurement configuration information through one or more piece of the above-described system information in order to reduce the SCell setup time.

The IDLE mode measurement configuration information may include at least one of i) a secondary candidate cell frequency, ii) a secondary-candidate-cell-specific sub-cell index information/cell identification information (Cell ID)/physical cell identification information/sub-frequency ID/cell indication field (configured using an integer value)/carrier indicator field/cgi-info (cellGlobalId, trackingAreaCode, plmn-Identitylist, frequency band indication information, iii) a local area network (LAN)-based paging region/code information) information, iv) Licensed Assisted Access (LAA) cell classification information, v) discovery signal measurement timing configuration (measDS-Config: dmtc-PeriodOffset, ds-OccasionDuration, MeasCSI-RS-Id, and MeasCSI-RS-Config), measurement band information, vi) measurement period information, vii) measurement item/target/reference symbol/classification information (RSRP/RSRQ/Received Signal Strength Indicator (RSSI)/Cell Specific Reference Signal (CRS)/Channel State Information-Reference Signals (CSI-RS)/NR SS/beam ID/discovery signal), viii) a condition for evaluating a measured value, ix) an LAA bandwidth/LAA channel number, and x) indication information for channel number.

For yet another example, the base station may add some pieces of various information included in the IDLE mode measurement configuration information to an RRC connection release message used by the terminal in the RRC Connected state to transition to the RRC IDLE state, and the base station may transmit the RRC connection release message. For example, the base station may inform the terminal in the RRC IDLE mode of at least one of i) SCellConfiguration (subframeStartPosition, laa-SCellSubframeConfig) for reducing the SCell setup time, ii) valid time information for low latency measurement, and iii) valid time information for low latency reporting.

The low latency measurement or low latency reporting operation (an operation of performing measurement in the RRC IDLE mode and reporting a result of the measurement) for the terminal in the RRC IDLE mode causes an increase in power consumption of the terminal. Accordingly, there is a need for a method of restricting the low latency measurement or low latency reporting operation for the terminal. For example, the measurement candidate cell list is provided to the terminal through physical cell identification information of each cell and is used to restrict a target cell or valid cell area in which the terminal performs low latency measurement. The terminal may only perform measurement on a cell with specified physical cell identification information. Alternatively, when the terminal moves from the cell with the specified physical cell identification information to another cell, the terminal may stop the low latency measurement or release a measurement configuration for the low latency measurement.

For another example, the valid time for the low latency measurement is used to restrict an IDLE mode measurement time of the terminal. When the valid time for the low latency measurement is received through the base station, the terminal may start a timer through a corresponding value and may perform IDLE mode measurement only when the timer is operating.

For another example, the condition for evaluating a measured value is used to restrict IDLE mode measurement reporting of the terminal. It is possible to prevent unnecessary measurement reporting by allowing the terminal to only perform measurement reporting on a cell exceeding a threshold value for evaluating a measured value.

For still another example, the base station may add at least one piece of the IDLE mode measurement configuration information to Message 4 (e.g., an RRC connection setup, RRC connection resumption, or RRC connection reestablishment message) during the RRC connection setup.

One or more of a physical cell identifier, a global cell identifier, a cell index, SCellindex, Servcellindex, a cell indication field (configured using an integer value), and a carrier indicator field may be used as the cell identification information. The terminal may add one or more pieces of the identification information to the IDLE mode measurement result information and then report the IDLE mode measurement result information to the base station.

The IDLE mode measurement configuration information may include measurement duration information (e.g., measurement period information) for the purpose of efficient measurement and power consumption for the terminal.

For example, the measurement duration information may be provided to the terminal as a different value depending on a cell-specific Discontinuous Reception (DRX) cycle length. For another example, the measurement duration information may be pre-configured in the terminal as a different value depending on a cell-specific DRX cycle length. For still another example, the measurement duration information may be provided to the terminal as a different value depending on a terminal-specific DRX cycle length. For further still another example, the measurement duration information may be pre-configured in the terminal as a different value depending on a terminal-specific DRX cycle length. For yet another example, the measurement duration information may be provided to the terminal as a different value depending on a terminal-specific DRX cycle length configured for RAN-based paging by the base station. For further yet another example, the measurement duration information may be pre-configured in the terminal as a different value depending on a terminal-specific DRX cycle length configured for RAN-based paging by the base station.

As described above, the measurement duration information may be provided to the terminal through an RRC connection release message Method for Enabling a Terminal in the RRC IDLE State to Transmit IDLE Mode Measurement Result Information after RRC Connection Setup The terminal may perform a procedure for transmitting the IDLE mode measurement result information to the base station while transitioning from the RRC IDLE mode to the RRC Connected mode.

For example, a reporting configuration for transmitting the IDLE mode measurement result information may be provided through separate configuration information different from measurement configuration information. For example, the reporting configuration may be provided through a separate SIB type different from a SIB type for providing the IDLE mode measurement configuration information. Alternatively, when the reporting configuration is provided through the same SIB type as that for providing the IDLE mode measurement configuration information, reporting configuration information may be provided through another information element different from a measurement configuration information element. Alternatively, the reporting configuration information may be transmitted through an RRC dedicated message. For example, the reporting configuration information may be included in an RRC connection release message or an RRC connection setup message and may be provided through another information element different from the measurement configuration information.

Meanwhile, for the purpose of efficient measurement or reporting of the terminal or power saving, the base station may deliver information for controlling reporting of the IDLE mode measurement result information to the terminal.

For example, the IDLE mode measurement result information transmitted through the system information or the RRC dedicated message may include one or more pieces of the following information.

The corresponding information may include, as radio quality information (or measurement result information, help information for cell configuration, or help information for call activation), one or more of terminal identification information, measurement result sub-frequency (measResultsServFreq) information, measurement result frequency information, secondary candidate cell frequency information, sub-cell indices of secondary candidate cells/cell identification information (Cell ID)/physical cell identification information/sub-frequency ID/cell indication field (configured by using an integer value)/carrier indicator field/LAA cell classification information/cgi-info (cellGlobalId, trackingAreaCode, plmn-Identitylist, frequency band indication information, LAN-based paging area/code information), discovery signal measurement timing configuration (measDS-Config: dmtc-PeriodOffset, ds-OccasionDuration, MeasCSI-RS-Id, MeasCSI-RS-Config), measurement band information, measurement period information, measurement items/target/reference symbol/classification (RSRP/RSRQ/RSSI/CRS/CSI-RS/NR SS/beam ID/discovery signal), condition/parameter/threshold/event for evaluating a measured value, LAA-SCellConfiguration (subframeStartPosition, laa-SCellSubframeConfig), RSRP result, RSRQ result, RSRP-range, RSSI, CSI-RS measurement result, NR SS measurement result, NR CSI-RS measurement result, whether measurement event (e.g., A1, A2, A3, A4, A5, and A6 measurement events) is satisfied or a threshold for determining secondary cell/cell/cell group configuration/activation/deactivation, whether threshold of each cell is satisfied, cell-specific cell quality priority information (e.g., cell-specific priority information of a cell to be activated), cell-specific cell quality state information (e.g., information indicating top/middle/bottom or activatable/fine/high), coding of cell-specific measurement result/abstraction information, cell-specific quality/measurement result range (range/scale/code), configurable/activatable secondary cell/list, best measurement result SCell/Cell/frequency information (best measurement result cell information or a specific number or more of best measurement result cell information), measurement result of best measurement result cell (rsrpResult, rsrqResult, rs-sinr-Result, best beam ID), or a specific number or more of best measurement results (rsrpResult, rsrqResult, rs-sinr-Result, a specific number or more of best beam IDs/best beam measurement results, an NR SS measurement result, an NR CSI-RS measurement result), the number of beams for averaging measurement results/the number of beams greater than or equal to an absolute value/the number of beams in a specific range and the specific range, the number of times the measurement results are averaged, a minimum number of measurements for measurement results, the last measurement result, the last measurement time, time elapsed since the last measurement, terminal location upon measurement, early measurement, and valid time of early reporting.

Meanwhile, the terminal may transmit the above-described IDLE mode measurement result information to the base station during or after the RRC connection setup.

For example, the terminal may add the IDLE mode measurement result information to an RRC connection setup completion message during the RRC connection setup process and transmit the RRC connection setup completion message to the base station.

For another example, the terminal may add the IDLE mode measurement result information to an RRC connection request message during the RRC connection setup process and transmit the RRC connection request message to the base station.

For further another example, when the base station adds information indicating permission of the above-described reporting to Message 4 (e.g., an RRC connection setup, RRC connection resumption, or RRC connection reestablishment message) during the RRC connection setup and provides the information to the terminal, the terminal may add the IDLE mode measurement result information to Message 5 (e.g., an RRC connection setup completion or RRC connection resumption completion message) and transmit Message 5 to the base station.

For still another example, when the base station broadcasts indication information indicating that the IDLE mode measurement result information may be processed through system information, the terminal may add presence indication information indicating that the terminal has stored the IDLE mode measurement result information for Message 5 during the RRC connection setup process and may transmit Message 5 to the base station.

For yet another example, when the RRC connection setup of the terminal is completed and it is determined, through Message 5, that the terminal has stored the IDLE mode measurement result information, the base station may transmit a terminal information request message to the terminal to request the IDLE mode measurement result information. The terminal may transmit a terminal information response message including the IDLE mode measurement result information in response to the terminal information request message.

Through the procedure, when the base station receives the IDLE mode measurement result information, the base station may provide an SCell configuration to the terminal on the basis of the IDLE mode measurement result information. That is, the base station may provide a secondary base station configuration or a secondary base station SCell configuration to the terminal on the basis of the IDLE mode measurement result information.

When the base station configures a specific radio flow, a specific Protocol Data Unit (PDU) session, or a core network bearer (or E-UTRAN Radio Access Bearer (E-RAB) or a specific radio flow group) to transmit user data through SCell, the base station should activate a corresponding cell.

To this end, as an example, the base station may configure the terminal by setting an activation state of a specific cell to be activated or deactivated. As another example, the base station may configure the terminal by setting an activation state of a specific cell group to be activated or deactivated. As further another example, the base station may configure the terminal by setting an activation state of each cell to be activated or deactivated.

Method for Controlling a Measurement Operation in the RRC IDLE Mode of the Terminal.

As described above, when the terminal performs a cell measurement operation in the RRC IDLE mode, power consumption may be caused for the cell measurement operation. Also, overhead and system load associated with transmission of the IDLE mode measurement result information may increase.

Accordingly, appropriate measures are required to reduce the power consumption, overhead, and system load.

For example, the base station may transmit information indicating permission for the measurement operation or the measurement result reporting operation in the RRC IDLE mode through the system information. For example, the permission information may consist of one or two bits and may set and indicate whether to permit the measurement operation or the measurement result reporting operation in the RRC IDLE mode. When the base station provides the information indicating the permission for the measurement operation or the measurement result reporting operation in the RRC IDLE mode, the terminal may perform a procedure for the operation. Alternatively, when the base station provides the information indicating the permission for the measurement operation or the measurement result reporting operation in the RRC IDLE mode, the terminal may receive IDLE mode measurement configuration information for indicating the measurement operation or the measurement result reporting operation in the RRC IDLE mode. Alternatively, when the base station provides the information indicating the permission for the measurement operation or the measurement result reporting operation in the RRC IDLE mode and also when the terminal has RRL IDLE mode operation capability (e.g., low latency measurement capability, low latency reporting capability, or specific terminal capability), the terminal may receive the IDLE mode measurement configuration information. Alternatively, the terminal may perform a procedure for the measurement operation or the measurement result reporting operation in the RRC IDLE mode.

For another example, when the terminal has an associated element for performing the measurement operation or the measurement result reporting operation in the RRC IDLE mode, the terminal may receive system information for indicating the measurement operation or the measurement result reporting operation in the RRC IDLE mode. Alternatively, the terminal may perform a procedure for the measurement operation or the measurement result reporting operation in the RRC IDLE mode. For example, the base station may provide the IDLE mode measurement configuration information, the IDLE mode measurement result reporting configuration information, or the specific terminal configuration information to the terminal through RRC signaling to control the terminal to apply the information. Alternatively, a mobility management entity (MME) may provide the IDLE mode measurement configuration information, the IDLE mode measurement result reporting configuration information, or the specific terminal configuration information to the terminal through non-access stratum (NAS) signaling to control the terminal to apply the information.

For still another example, the base station may add information for restricting the measurement operation or the measurement result reporting operation in the RRC IDLE mode to the IDLE mode measurement configuration information and then provide the IDLE mode measurement configuration information to the terminal. For example, the base station may provide the measurement duration information to the terminal to perform control such that the IDLE mode measurement configuration information is configured in the terminal only for a certain period of time. The measurement duration information may be delivered separately from the other IDLE mode measurement configuration information. For example, the IDLE mode measurement configuration information may be provided to the terminal through SIB5, and the measurement duration information may be provided to the terminal through the RRC connection release message.

For further another example, when the base station sets the information, which indicates the permission of the measurement operation or the measurement result reporting operation in the RRC IDLE mode, to indicate non-permission and then provides the information to the terminal, the terminal does not initiate reception of associated configuration information for the measurement operation or the measurement result reporting operation in the RRC IDLE mode or ignores/removes/deletes/discards the configuration information.

For further still another example, when the base station transmits the system information for the measurement operation or the measurement result reporting operation in the RRC IDLE mode, the terminal may perform for the measurement operation or the measurement result reporting operation in the RRC IDLE mode. That is, when the IDLE mode measurement configuration information is broadcast by the base station, the terminal may perform the measurement operation or the measurement result reporting operation in the RRC IDLE mode.

Terminal Operation Method Caused by Cell Reselection or the Like.

For example, the base station may add IDLE mode measurement configuration information for reducing an SCell setup time of the terminal in the RRC IDLE state to the RRC connection release message and provide the RRC connection release message to the terminal. The terminal applies or stores the received IDLE mode measurement configuration information. Meanwhile, the terminal in the IDLE state may perform a cell reselection operation to select a new cell when moving toward the cell. In this case, the terminal may release or delete the IDLE mode measurement configuration information or the IDLE mode measurement result reporting configuration information. The terminal may perform the above-described operations for IDLE mode measurement configuration or IDLE mode measurement result reporting configuration through system information of the cell reselected due to the movement. Alternatively, the terminal may update some or all parameters of the IDLE mode measurement configuration information of the old cell through system information broadcast by the reselected cell.

For another example, the base station may add the IDLE mode measurement configuration information for reducing the SCell setup time of the terminal in the RRC IDLE state to system information (e.g., SIB5) and provide the system information to the terminal. The terminal applies or stores the received IDLE mode measurement configuration information. Meanwhile, the terminal in the IDLE state may perform a cell reselection operation to select a new cell when moving toward the cell. In this case, the terminal may release or delete the IDLE mode measurement configuration information or the IDLE mode measurement result reporting configuration information. The terminal may perform the above-described operations for IDLE mode measurement configuration or IDLE mode measurement result reporting configuration through system information of the cell reselected due to the movement. Alternatively, the terminal may update some or all parameters of the IDLE mode measurement configuration information of the old cell through system information broadcast by the reselected cell.

For still another example, the base station may add the IDLE mode measurement configuration information, which is for reducing the SCell setup time of the terminal in the RRC IDLE state, to the RRC connection release message or system information (e.g., SIB5) and provide the RRC connection release message or the system information to the terminal. The terminal applies or stores the received IDLE mode measurement configuration information. Meanwhile, the terminal in the IDLE state may perform a cell reselection operation to select a new cell when moving toward the cell. When the terminal enters the RRC Connected state, when the terminal performs Public Land Mobile Network (PLMN) selection performed according to a request by a NAS, when the terminal selects another PLMN different from that of a corresponding cell, when the terminal selects another radio access technology (RAT), or a valid time received by the terminal through a message expires, the terminal may release or delete the measurement configuration information or the reporting configuration from among the stored IDLE mode measurement configuration information. The terminal may perform the above-described operations for IDLE mode measurement configuration or IDLE mode measurement result reporting configuration through system information of the cell reselected due to the movement. Alternatively, the terminal may update some or all parameters of the IDLE mode measurement configuration information of the old cell through system information broadcast by the reselected cell.

As described above, when the cell reselection operation occurs, the terminal may update a configuration associated with the RRC IDLE measurement operation or release a configuration associated with previous measurement operations and apply a new configuration on the basis of a new cell being selected.

Method for Indicating RRC IDLE Mode Measurement Configuration Information in Consideration of a Terminal State and Terminal Operation Method Thereof The base station may transmit one or more pieces of IDLE mode measurement configuration information in consideration of a terminal state or terminal capability. For example, the base station may transmit a plurality of pieces of IDLE mode measurement configuration information in consideration of a mobility state of the terminal, and the terminal may select any one piece from the IDLE mode measurement configuration information on the basis of its own mobility state.

For example, the base station may provide, to the terminal, IDLE mode measurement configuration information for each mobility state of the terminal.

For another example, the base station may provide, to the terminal, IDLE mode measurement configuration information for each power preference state of the terminal. For example, when power preference of the terminal is set to power saving preference, the terminal may ignore one or more of the plurality of pieces of IDLE mode measurement configuration information. Alternatively, when power preference of the terminal is not set to power saving preference, the terminal may perform an operation corresponding to the IDLE mode measurement configuration information.

For another example, the base station may provide, to a terminal with a specific capability, information for instructing the terminal to perform a procedure using the IDLE mode measurement configuration information. For example, the base station may provide, to a 5G/NR capable terminal, an E-UTRAN New Radio-Dual Connectivity (EN-DC) capable terminal, or a CA capable terminal, information for instructing the terminal to perform a procedure using the IDLE mode measurement configuration information. A terminal that supports the corresponding capability may perform an operation corresponding to the IDLE mode measurement configuration information. A terminal that does not support the corresponding capability may ignore the IDLE mode measurement configuration information.

For still another example, the terminal may transmit, to the base station, terminal capability information indicating that the terminal supports an operation of performing measurement and an operation of reporting a result of the measurement in the RRC IDLE mode. For example, the terminal may add the terminal capability information to an RRC connection request message (MSG 3) and transmit the RRC connection request message. Alternatively, the terminal may add the terminal capability information to an RRC connection setup completion message (MSG 5) and transmit the RRC connection setup completion message. Alternatively, the terminal may transmit the terminal capability information to the base station through a terminal capability transfer procedure. Alternatively, the terminal may transmit the terminal capability information to the base station through an MME.

As described above, the base station may control the terminal in the RRC IDLE mode to perform a cell or carrier channel state measurement operation, receive measurement result information quickly after the terminal transitions to the RRC Connected state, and allow data transmission to be quickly performed through SCell. Thus, according to this disclosure, it is possible to increase a data offloading effect of the terminal.

Elements of the terminal and the base station which may perform some or all of the aforementioned embodiments will be described with reference to the accompanying drawings.

Figure 7:
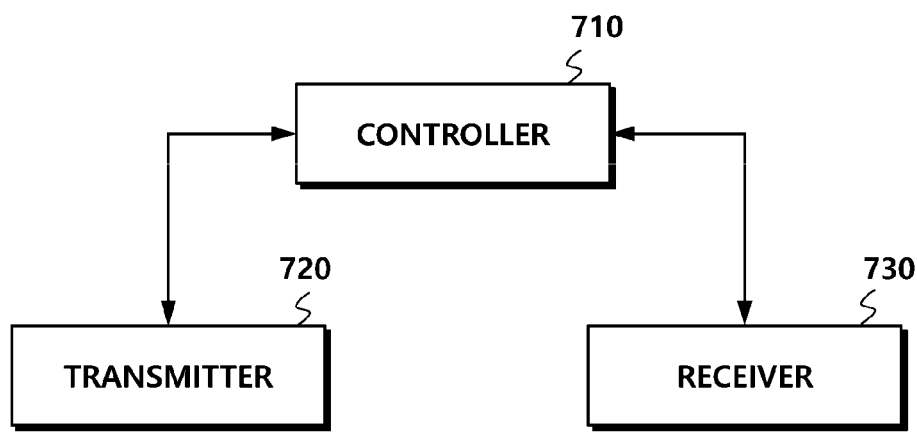
FIG. 7 shows constituent elements of a terminal according to an embodiment.

FIG. 7 shows constituent elements of a terminal according to an embodiment.

Referring to FIG. 7, a terminal 700 that performs a measurement operation in an RRC IDLE mode may include a receiver 730, a controller 710, and a transmitter 720. The receiver 730 may be configured to receive IDLE mode measurement configuration information used by the terminal to measure a channel state in the RRC IDLE mode from the base station. The controller 710 may be configured to store or apply the IDLE mode measurement configuration information. The transmitter 720 may be configured to transmit IDLE mode measurement result information, which is measured in the RRC IDLE mode on the basis of the IDLE mode measurement configuration information, to the base station.

For example, the receiver 730 may receive measurement configuration information, which is needed to perform the measurement operation on a cell or carrier in the RRC IDLE state, from the base station. The IDLE mode measurement configuration information may be received while the terminal is in the RRC Connected state or during an RRC connection release operation.

For an example, the IDLE mode measurement configuration information may include at least one of measurement target carrier frequency information, measurement duration information, target cell list information, and measurement reference information, which are used by the terminal to perform the measurement operation in the RRC IDLE mode.

For another example, the IDLE mode measurement configuration information may include valid area information including a cell list for indicating whether the terminal maintains the RRC IDLE mode measurement operation according to a cell re-selection operation of the terminal.

The receiver 730 may receive the IDLE mode measurement configuration information through SIB5 or an RRC connection release message.

For example, the receiver 730 may receive the IDLE mode measurement configuration information through an SIB5 signal. For another example, the receiver 730 may receive the IDLE mode measurement configuration information through an RRC connection release message that is received while the terminal transitions from the RRC Connected mode to the RRC IDLE mode. For still another example, the receiver 730 may receive information included in the IDLE mode measurement configuration information through different signals. In detail, the receiver 730 may receive at least one of the measurement target carrier frequency information, the target cell list information, the measurement reference information, and the valid area information through the SIB5 signal and may receive measurement duration information through the RRC connection release message.

Meanwhile, the measurement duration information may include valid time information for restricting the RRC IDLE mode measurement operation of the terminal, and the target cell list information may include one or more pieces of physical cell identification information. The valid time information is applied to a timer and configured in the terminal, and the controller 710 may determine whether to execute the RRC IDLE mode measurement operation and whether to store/apply the IDLE mode measurement configuration information according to activation or expiration of the timer.

Also, the controller 710 may store or apply the IDLE mode measurement configuration information, which is received through SIB5 or the RRC connection release message, to control the RRC IDLE mode measurement operation. The RRC IDLE mode measurement operation may be performed after the terminal transitions from the RRC Connected state to the RRC IDLE state. For example, while a valid time of the timer is set according to the measurement duration information included in the IDLE mode measurement configuration information is running, the controller 710 may perform the RRC IDLE mode measurement operation on the measurement target carrier frequency. Alternatively, when the timer having the valid time expires, the controller 710 may release the received IDLE mode measurement configuration information. For example, the controller 710 may delete or deactivate the IDLE mode measurement configuration information to which the timer is applied.

Also, the controller 710 may store, in the terminal, a measurement result value for each cell or carrier acquired through the RRC IDLE mode measurement operation. The stored measurement result value may be included in IDLE mode measurement result information.

According to the RRC IDLE mode measurement operation, the controller 710 may measure a channel state (or channel quality) of a measurement target cell or carrier, and the transmitter 720 may add information regarding a result of the measurement to the IDLE mode measurement result information and transmit the measurement result information to the base station when the terminal transitions to the RRC Connected state. For example, when the transition from the RRC IDLE mode to the RRC Connected state is completed, the transmitter 720 may add the IDLE measurement result information to an RRC connection setup completion message or an RRC connection resumption completion message and transmit the message to the base station.

The controller 710 may measure the channel state of the measurement target carrier or cell on the basis of the IDLE mode measurement configuration information. Also, the controller 710 may compare a measurement result value for each cell or carrier to a measurement reference included in the IDLE mode measurement result information and may store measurement result values for cells or carriers exceeding the measurement reference.

The receiver 730 may further receive SIB2 including indication information indicating that the base station can receive and process the IDLE mode measurement result information. Also, the receiver 730 may further receive a terminal information request message for requesting the IDLE mode measurement result information from the base station.

The transmitter 720 may transmit presence indication information indicating the presence of the IDLE mode measurement result information during the RRC connection setup process to the base station, add the IDLE mode measurement result information to a terminal information response message, and then transmit the terminal information response message to the base station. For example, the transmitter 720 may add the presence indication information to an RRC connection setup completion message or an RRC connection resumption completion message and then transmit the message to the base station.

In addition, the transmitter 720 and the receiver 730 are used to transmit and receive signals, messages, and information needed to implement the aforementioned embodiments to and from the base station. The controller 710 controls the channel measurement operation in the RRC IDLE mode of the terminal, which is needed to implement the aforementioned embodiment and also control the entire operation of the terminal 700 when reporting a result of the operation to the base station.

Figure 8:
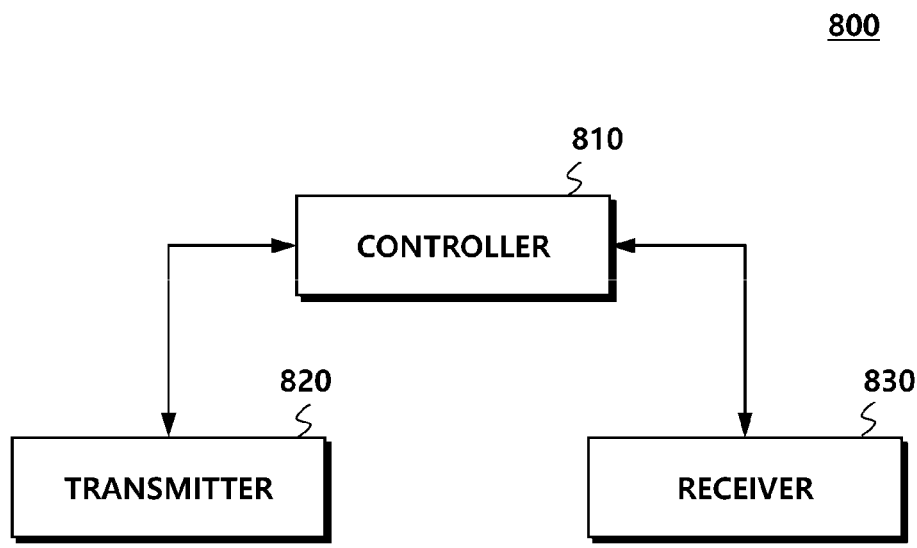
FIG. 8 shows constituent elements of a base station according to an embodiment.

FIG. 8 shows constituent elements of a base station according to an embodiment.

Referring to FIG. 8, a base station 800 that controls an RRC IDLE mode measurement operation of a terminal may include a controller 810, a transmitter 820, and a receiver 830. The controller 810 may be configured to generate IDLE mode measurement configuration information for measuring a channel state in an RRC IDLE mode of the terminal. The transmitter 820 may be configured to add the IDLE mode measurement configuration information to SIB5 or an RRC connection release message and then transmit the SIB5 or the RRC connection release message to the terminal. The receiver 830 may be configured to receive IDLE mode measurement result information measured in the RRC IDLE mode on the basis of the IDLE mode measurement configuration information.

The transmitter 820 may transmit SIB2 including indication information indicating that the base station can process the IDLE mode measurement result information and may transmit a terminal information request message for requesting the IDLE mode measurement result information.

The receiver 830 may receive presence indication information indicating the presence of the IDLE mode measurement result information during the RRC connection setup process of the terminal and may receive a terminal information response message including the IDLE mode measurement result information. For example, the receiver 830 may receive an RRC connection setup completion message or an RRC connection resumption completion message to which the presence indication information is added.

In addition, the transmitter 820 and the receiver 830 are used to transmit and receive signals, messages, and information needed to implement the aforementioned embodiments to and from the terminal. The controller 810 controls the channel measurement operation in the RRC IDLE mode of the terminal, which is needed to implement the aforementioned embodiment and also controls the entire operation of the base station 800 when reporting a result of the operation to the base station.

According to the present disclosure, it is possible to reduce the overall time required for carrier aggregation by providing a specific procedure of a carrier (cell) measurement operation in the RRC IDLE mode of the terminal and delivering a corresponding result report to the base station when the terminal transitions to the RRC Connected state.

The terms "system," "processor," "controller," "component," "module," "interface," "model," "unit," and the like may generally refer to a computer-related entity such as hardware, a combination of hardware and software, software, or running software. For example, the above-described components may be, but are not limited to, a process driven by a processor, a processor, a controller, a control processor, an entity, an execution thread, a program, and/or a computer. For example, all of a controller or processor and an application running on the controller or processor may be elements. One or more elements may reside within a process and/or an execution thread and may be located in one system or distributed to two or more systems.

Specifications and standards mentioned in the foregoing embodiments have been omitted herein to simplify the description of the present specification but still constitute part of the present specification. Therefore, it should be understood that parts of the specifications and standards can be added to the present specification or be specified in the claims and still be within the scope of the present invention.

The above-described subject matter of the present invention is to be considered illustrative and not restrictive, and it should be understood that numerous other modifications and embodiments can be devised by those skilled in the art that will fall within the spirit and scope of the principles of the present invention. Therefore, the embodiments disclosed herein are intended not to limit but to describe the technical spirit of the present invention, and the scope of the present invention is not limited to the embodiments. The scope of the invention should be construed by the appended claims, and all technical sprits within the scope of their equivalents should be construed as included in the scope of the invention.

What is claimed is:

1. A method of a terminal for performing a measurement operation in a Radio Resource Control (RRC) IDLE mode, the method comprising:
   receiving, from a base station, IDLE mode measurement configuration information for measuring a channel state while the terminal is in the RRC IDLE mode;
   performing at least one of storing and applying the IDLE mode measurement configuration information; and
   transmitting, to the base station, IDLE mode measurement result information, which is measured in the RRC IDLE mode based on the IDLE mode measurement configuration information,
   wherein the transmitting of the IDLE mode measurement result information comprises:
   comparing a measurement result value for each cell, which is measured in the RRC IDLE mode, to measurement reference information included in the IDLE mode measurement configuration information and storing measurement result values for cells exceeding the measurement reference as the IDLE mode measurement result information;
   receiving system information block 2 (SIB2) including indication information indicating that the base station is able to process the IDLE mode measurement result information;
   transmitting, to the base station, presence indication information indicating presence of the IDLE mode measurement result information during an RRC connection setup process of the terminal; and
   adding the IDLE mode measurement result information to a terminal information response message and transmitting the terminal information response message to the base station when a terminal information request message is received from the base station.

2. The method of claim 1,
   wherein the IDLE mode measurement configuration information is included in at least one of system information block 5 (SIB5) and an RRC connection release message; and
   wherein the IDLE mode measurement configuration includes at least one of measurement target carrier frequency information, measurement duration information, target cell list information, and measurement reference information, which are used by the terminal to perform the measurement operation in the RRC IDLE mode.

3. The method of claim 2,
   wherein the measurement duration information includes valid time information for restricting the RRC IDLE mode measurement operation of the terminal, and
   wherein the target cell list information includes one or more pieces of physical cell identification information.

4. The method of claim 1, wherein the IDLE mode measurement configuration information includes valid area information, which includes a cell list for indicating whether the terminal maintains the RRC IDLE mode measurement operation according to a cell reselection operation of the terminal.

5. The method of claim 1, wherein the performing at least one of storing and applying of the IDLE mode measurement configuration information comprises performing the RRC IDLE mode measurement operation on a measurement target carrier frequency when a timer set with a predetermined valid time is in operation according to measurement duration information included in the IDLE mode measurement configuration information.

6. The method of claim 5, wherein the IDLE mode measurement configuration information is released when the timer expires.

7. The method of claim 1, wherein the presence indication information is included in at least one of an RRC connection setup completion message and an RRC connection resumption completion message.

8. A method of a base station for controlling a Radio Resource Control (RRC) IDLE mode measurement operation of a terminal, the method comprising:
   generating IDLE mode measurement configuration information for measuring a channel state in an RRC IDLE mode of the terminal;
   adding the IDLE mode measurement configuration information to at least one of system information block 5 (SIB5) and an RRC connection release message and then transmitting at least one of the SIB5 and the RRC connection release message to the terminal; and
   receiving IDLE mode measurement result information measured in the RRC IDLE mode based on the IDLE mode measurement configuration information,
   wherein the receiving of the IDLE mode measurement result information comprises:
   transmitting system information block 2 (SIB2) including indication information indicating that the base station is able to process the IDLE mode measurement result information;
   receiving presence indication information indicating presence of the IDLE mode measurement result information during an RRC connection setup process of the terminal;
   transmitting a terminal information request message for requesting the IDLE mode measurement result information; and
   receiving a terminal information response message including the IDLE mode measurement result information in which measurement result values for cells exceeding the measurement reference are stored after comparison a measurement result value for each cell, which is measured in the RRC IDLE mode, to measurement reference information included in the IDLE mode measurement configuration information.

9. The method of claim 8, wherein the IDLE mode measurement configuration information includes at least one of measurement target carrier frequency information, measurement duration information, target cell list information, measurement reference information, and valid area information, wherein the measurement target carrier frequency information, measurement duration information, target cell list information, and measurement reference information are used by the terminal to perform the measurement operation in the RRC IDLE mode, and the valid area information includes a cell list for indicating whether the terminal maintains the RRC IDLE mode measurement operation according to a cell reselection operation of the terminal.

10. The method of claim 8, wherein the presence indication information is included in at least one of an RRC connection setup completion messages and an RRC connection resumption completion message.

11. A terminal for performing a measurement operation in a Radio Resource Control (RRC) IDLE mode, the terminal comprising:

a receiver configured to receive IDLE mode measurement configuration information for measuring a channel state while the terminal is in the RRC IDLE mode from a base station;
a controller configured to perform at least one of storing and applying the IDLE mode measurement configuration information; and
a transmitter configured to transmit IDLE mode measurement result information, which is measured in the RRC IDLE mode based on the IDLE mode measurement configuration information, to the base station,
wherein the controller compares a measurement result value for each cell, which is measured in the RRC IDLE mode, to measurement reference information included in the IDLE mode measurement configuration information and stores measurement result values for cells exceeding the measurement reference as the IDLE mode measurement result information,
wherein the receiver further receives system information block 2 (SIB2) including indication information indicating that the base station is able to process the IDLE mode measurement result information and receives a terminal information request message, and
wherein the transmitter transmits, to the base station, presence indication information indicating presence of the IDLE mode measurement result information during an RRC connection setup process of the terminal, adds the IDLE mode measurement result information to a terminal information response message, and then transmits the terminal information response message to the base station.

12. The terminal of claim 11,
wherein the IDLE mode measurement configuration information is included in at least one of system information block 5 (SIB5) and an RRC connection release message, and
wherein the IDLE mode measurement configuration information includes at least one of measurement target carrier frequency information, measurement duration information, target cell list information, and measurement reference information, which are used by the terminal to perform the measurement operation in the RRC IDLE mode.

13. The terminal of claim 12,
wherein the measurement duration information includes valid time information for restricting the RRC IDLE mode measurement operation of the terminal, and
wherein the target cell list information includes one or more pieces of physical cell identification information.

14. The terminal of claim 11, wherein the IDLE mode measurement configuration information includes valid area information, which includes a cell list for indicating whether the terminal maintains the RRC IDLE mode measurement operation according to a cell reselection operation of the terminal.

15. The terminal of claim 11, wherein the controller performs the RRC IDLE mode measurement operation on a measurement target carrier frequency when a timer set with a predetermined valid time is in operation according to measurement duration information included in the IDLE mode measurement configuration information.

16. The terminal of claim 15, wherein the IDLE mode measurement configuration information is released when the timer expires.

17. The terminal of claim 11, wherein the presence indication information is added to at least one of an RRC connection setup completion messages and an RRC connection resumption completion message and then transmitted.

* * * * *